3,369,910
FREEZE-THAW STABLE FOOD PRODUCTS
Alexander J. Ganz, Wilmington, and George C. Harris, Normandy Manor, Del., assignors to Hercules Incorporated, a corporation of Delaware
No Drawing. Filed Mar. 24, 1965, Ser. No. 442,496
8 Claims. (Cl. 99—139)

This invention relates to food products of improved properties and more particularly to such products comprising hydroxypropyl starch as one ingredient.

Starch is used as a thickener in foods, e.g. in gravies, sauces, pie fillings, puddings and the like. This use would be considerably greater if certain difficulties heretofore encountered could be overcome or minimized. Before use many food products are frozen and/or cooked. Frozen food products, of course, must be either thawed or thawed and cooked before use. Also, food products may undergo one or more freeze-thaw cycles before use due to fluctuations in temperature of storage or transit. In both the cooking and the freeze-thawing of food products containing starch as a thickener, serious difficulties are encountered. These difficulties result in the food products becoming unstable. One difficulty is that liquid separates out of the food, giving a distinct liquid portion and a solid portion instead of a homogeneous mixture. Another difficulty is that such foods are apt to set up to a cloudy gel upon cooking and cooling. Still another difficulty is that the viscosity of the food product decreases too much during cooking and before cooling; this is sometimes called "cookout." These difficulties may also involve various degrees of curdling, lumping, becoming grainy, unpleasant in taste, mouthfeel, and appearance. One or more of these difficulties may also arise even in the absence of freezing, freeze-thawing and/or cooking.

The present invention either substantially eliminates or minimizes these difficulties by employing hydroxypropyl starch as the thickener. Although we are not certain why, thus far we have found the present invention is restricted to hydroxypropyl starch. Even hydroxyethyl starch did not give satisfactory results.

The following examples illustrate specific embodiments of the present invention; however, they are not intended to limit the scope of the present invention defined in the appended claims. Cycling and centrifuging include two of the methods used in determining the stability of foods or food additives containing a thickener. Both methods were used in the examples given hereinafter. In these examples and elsewhere herein, percent and parts are by weight unless otherwise indicated.

EVALUATION OF THICKENERS IN GRAVY

The cycling method was used in this evaluation.

A conventional chicken broth having suspended therein 5% thickener was heated to the boiling point and boiled 5 minutes in an open vessel. The water which had evaporated was replaced. The resulting broth was quick frozen at $-10°$ C. and stored at that temperature. Once each 24 hours the broth was removed from storage, allowed to come to room temperature and then examined for the presence of separated water, curdling, graininess. lumping, etc. The freezing at $-10°$ C., storing at that temperature and allowing to come to room temperature completed a cycle. Further details appear in Table 1 hereinafter. Under "Stability, No. of Cycles" in Table 1: (1) If a material failed on the first cycle, it was given a rating of 0. (2) If a material had not failed after 25 cycles, the test was discontinued. (3) All values between 0 and 25 indicate that the material failed in the following cycle.

TABLE 1.—EVALUATION OF THICKENERS IN GRAVY

| Example No. | Thickener | Stability, No. of Cycles |
|---|---|---|
| 1 | Wheat Starch | 0 |
| 2 | Hydroxypropyl Wheat Starch M.S. 0.065 | 25 |
| 3 | Hydroxypropyl Wheat Starch of Example 2 cross-linked with 100 p.p.m. POCl$_3$. | 18 |
| 4 | Corn Starch | 0 |
| 5 | Hydroxypropyl Corn Starch M.S. 0.07 | 8 |
| 6 | Waxy Maize Starch | 8 |
| 7 | Hydroxypropyl Waxy Maize Starch M.S. 0.07. | 25 |
| 8 | Potato Starch | 0 |
| 9 | Tapioca Starch | 2 |

EVALUATION OF THICKENERS IN WHITE SAUCE

The white sauce was prepared as follows.

*White sauce preparation and composition*

Ingredient: Amount, percent
  Skim milk _____ 90.2
    Prepared by dissolving 1 part of skim milk solids in 9 parts of water.
  Thickener _____ 4.6
    Mix with skim milk.
  Shortening _____ 4.6
    Melt and stir into milk-thickener mixture, then heat at 95° C. for 5 minutes while continuing to stir.
  Salt _____ 0.6
    Add and stir for 20 seconds.
    Replace water lost by evaporation while continuing to stir.
    Place final mixture in cans, seal and quick freeze at $-10°$ C.

Further details appear in Table 2 hereinafter.

The centrifugation method was used in evaluating the resulting white sauce. The amount of water which separated on centrifuging and other properties of the sauce were determined after subjecting same to the conditions indicated. Centrifuging was carried out with a Sorvall angle centrifuge, SS3, operating for 20 minutes at 12,500 r.p.m.

TABLE 2.—EVALUATION OF THICKENERS IN WHITE SAUCE

| Example No. | Tested immediately after preparation | | | | | | Stored 1 month at −10° C., brought to room temperature and refrozen twice, brought to room temperature again and tested | | | | | |
|---|---|---|---|---|---|---|---|---|---|---|---|---|
| | Score [1] | | | | | Sepn., percent [6] | Score [1] | | | | | Sepn., percent [6] |
| | Texture [2] | Separation [3] | Smoothness [4] | Mouthfeel [5] | Total Score [7] | | Texture [2] | Separation [3] | Smoothness [4] | Mouthfeel [5] | Total Score [7] | |
| 10. Flour | 10 | 10 | 9 | 9 | 38 | 16 | 1 | 0 | 1 | 2 | 4 | 60 |
| 11. Wheat Starch | 10 | 10 | 10 | 9 | 39 | 9 | 4 | 0 | 5 | 5 | 14 | 45 |
| 12. Hydroxypropyl Wheat Starch M.S. 0.07 | 7 | 10 | 10 | 6 | 33 | 0 | 5 | 10 | 10 | 5 | 30 | 2.5 |
| 13. Hydroxypropyl Wheat Starch of Example 12, Cross-Linked With 100 p.p.m. POCl$_3$ | 10 | 10 | 10 | 9 | 39 | 0 | 9 | 10 | 10 | 9 | 38 | 27 |
| 14. Hydroxypropyl Corn Starch M.S. 0.07 | 10 | 10 | 7 | 8.5 | 35.5 | 0 | 5 | 10 | 7 | 7 | 29 | 10 |

[1] Organoleptic evaluation.
[2] Short =10 Long, stringy =0.
[3] No free water =10. Curdled and lots of free water =0.
[4] Smooth =10; Lumpy =0.
[5] Smooth =10; Grainy, cloying, unpleasant =0.
[6] Upon centrifugation.
[7] Maximum Total Score =40.

EVALUATION OF THICKENERS IN FRUIT PIE FILLING

The fruit pie filling was prepared as follows:

*Fruit pie filling preparation and composition*

Ingredient: Amount, percent
- Cherry Juice (from water packed, sour red sour cherries) — 21
- Water — 12.5
  - Mix water with juice and heat just to boil
- Hydroxyl wheat starch M.S. 0.07 — 3.5
- Water — 7.0
  - Slurry starch in water and add slurry to aqueous cherry juice then cook resulting mixture clear (to about 190° F.)
- Sugar — 17
  - Add, dissolve, reheat to 180° F.
- Cherries (drained) — 39
  - Add, reheat to 180° F.

As compared with the same fruit pie filling, except one with wheat starch instead of hydroxypropyl wheat starch, this gave a clear, smooth, nongranular pie filling with a desirable, limited flow that did not set up to a gel and had no starchy off-taste; in addition, it has substantially increased freeze-thaw stability as well as substantial-increased stability in the absence of freezing and thawing.

EVALUATION OF THICKENERS IN PUDDING

*Pudding preparation and composition*

Ingredient: Amount, percent
- Powdered sugar — 74.5
- Hydroxypropyl wheat starch M.S. 0.03 — 20.0
- Calcium acetate — 1.0
- Tetrasodium pyrophosphate — 2.5
- Flavor and color — 1.5
- Salt — 0.5
  - Stir the resulting dry mix into whole milk, using 2 ounces of said dry mix per cup of whole milk.

As compared with the same pudding mix, except one with wheat starch instead of hydroxypropyl wheat starch, this gave a clear, smooth, nongranular pudding mix with no starchy off-taste; in addition, it has substantially increased freeze-thaw stability as well as substantially increased stability in the absence of freezing and thawing.

The amount of hydroxypropyl starch used in the present invention is not critical. The amount which one would use depends on the type food product being prepared and the degree of thickening desired. Any amount of hydroxypropyl starch gives some thickening. The degree of thickening increases directly with the amount of hydroxypropyl starch, so that eventually a point would be reached at which it would be difficult to mix. Usually the amounts of hydroxypropyl starch will fall within 1%–10%, preferably 2.5%–6.5%, by weight of the total wet mixture.

The hydroxypropyl starch for use in the present invention preferably will have an M.S. of at least about 0.03, although hydroxypropyl starch of lower M.S. values do give some improvement. Hydroxypropyl starch of M.S. 0.15 and 0.21 gave good results in accordance with the present invention, remaining stable even after 19 freeze-thaw cycles. There is no upper M.S. limit except that dictated by economy. Normally, there would not be adequate justification for exceeding an M.S. of about 0.5, although hydroxypropyl starch of M.S. values higher than 0.5 are operable in the present invention.

M.S. is the average number of moles of etherifying reagent (e.g. propylene oxide) combined with the starch per anhydroglucose unit. There are three hydroxyl groups in each anhydroglucose unit in the starch molecule. Thus, of course, the maximum M.S. is three based on hydroxyalkyl substituent groups which can be introduced into the starch molecule. However, each time a hydroxyalkyl group is introduced into the starch molecule, an additional hydroxyl group is formed which itself is capable of hydroxyalkylation. As a result of this, side chains of considerable length may form on the starch molecule during hydroxylation. Hence, the M.S. of the hydroxyalkyl starch may exceed three to the extent to which side chains are formed during the hydroxyalkylation.

Preparation of the hydroxypropyl starch is not critical nor per se a part of the present invention. Several methods are known for its preparation, one suitable method being that disclosed and claimed in Harris and Leonard U.S. Patent 3,070,594. The hydroxypropyl starch may be either of the granular (ungelatinized) or gelatinized type. That is, the starch granule may have been substantially maintained or substantially destroyed during preparation of the hydroxypropyl starch. Likewise, cross-linking of the hydroxypropyl starch is not critical nor per se a part of the present invention, such cross-linking being well known. However, for the sake of completeness the particular methods used in preparing the hydroxypropyl starch and the cross-linked hydroxypropyl starch used in the examples hereinbefore will now be given.

*Preparation of hydroxypropyl starch*

450 grams of starch was suspended in 450 cc. water containing 120 grams sodium sulfate in solution. To this suspension was added a solution of 4 grams sodium hydroxide and 30 grams sodium sulfate in 150 cc. water. The sodium sulfate serves as a gelatinization inhibitor. This procedure gave the desired alkali starch.

To this alkali starch was added 28 grams of propylene oxide to prepare hydroxypropyl starch of M.S. 0.07.

The temperature of the reaction mixture was brought to 70° C. over a period of 2 hours and maintained at 70° C. for 2 hours. The reaction mixture was cooled to 30° C., the pH taken to 5.0 with 18% HCl, the product centrifuged and washed with water, and finally dried through acetone and at 60° C. overnight.

*Preparation of cross-linked hydroxypropyl starch*

First hydroxypropyl starch was prepared in accordance with the procedure given hereinbefore down through etherifying for 2 hours at 70° C. and cooling the reaction mixture to 30° C. To the cooled reaction mixture was added 100 p.p.m. of phosphorous oxychloride (i.e. $POCl_3$) by weight of the hydroxypropyl starch.

The resulting reaction mixture was agitated for 1 hour whereupon the pH thereof was taken to 5.0. Then the cross-linked hydroxypropyl starch was centrifuged and washed with water, and dried through acetone and at 60° C. overnight.

As is well known, various cross-linking agents other than phosphorous oxychloride can be used. These include, e.g., acrolein, epichlorohydrin, adipic anhydride, succinic anhydride, 1-octenyl succinic anhydride, 1-octenyl succinic anhydride together with aluminum sulfate, and sodium trimetaphosphate.

The use of a cross-linked starch ether is not per se a part of the present invention nor is it necessary. However, it is often desirable where one wishes to increase the stability of the food product at elevated temperature. Cross-linking reduces "cookout," i.e. reduces the loss in viscosity which occurs during cooking and before cooling.

Of course, the M.S. and degree of the cross-linking will vary directly with the amount of propylene oxide and cross-linking reagent employed.

One may start with any source of starch to prepare the hydroxypropyl starch for use in the present invention including, e.g., wheat, corn, potato, tapioca, waxy maise, waxy sorghum, sago, rice and mixtures of two or more of these.

Sweeteners may or may not be used, as desired, in the food products of the present invention. If any sweetener is desired, sweeteners in general are well known for such use. These include, e.g., natural as well as synthetic materials. Examples of natural sweeteners include sugar, syrups, honey. Examples of synthetic sweeteners include saccharin, cyclohexanesulfamic acid and the sodium and calcium salts of said acid, these salts being referred to in the trade as sodium cyclamate and calcium cyclamate.

Likewise fats may or may not be used, as desired, in the food products of the present invention. If a fat is desired, there are numerous ones which are well known in the art for use in food products of the type of the present invention. These include, e.g., triglyceride esters of glycerin, saturated and unsaturated fatty acids, various oils such as peanut oil and cotton seed oil, butter, lard, rendered fats (e.g. rendered chicken fat), shortening (i.e. partially or completely hydrogenated oil).

In preparing certain food products of the present invention, e.g. those including fruit, the water in the fruit may be sufficient so that water is not required to be added as such.

As many apparent and widely different embodiments of this invention may be made without departing from the spirit and scope thereof, it is to be understood that the invention is not limited to the specific embodiments thereof except as defined in the appended claims.

What we claim and desire to protect by Letters Patent is:

1. A fruit pie filling which is stable after freezing and thawing comprising fruit and noncross-linked hydroxypropyl starch.

2. A fruit pie filling which is stable after freezing and thawing comprising fruit, fruit juice, noncross-linked hydroxypropyl starch and water.

3. A substantially dry mix which when mixed with water forms a white sauce, said dry mix comprising milk solids and noncross-linked hydroxypropyl starch, both said dry mix and said aqueous final mix being stable after freezing and thawing.

4. A substantially dry mix which when mixed with water forms a white sauce, said dry mix comprising milk solids, fat and noncross-linked hydroxypropyl starch, both said dry mix and said aqueous final mix being stable after freezing and thawing.

5. A substantially dry mix which when mixed with water forms a gravy, said dry mix comprising noncross-linked hydroxypropyl starch and flavoring, both said dry mix and said aqueous final mix being stable after freezing and thawing.

6. A substantially dry mix which when mixed with water forms a gravy, said dry mix comprising milk solids, fat, hydroxypropyl starch and flavoring, both said dry mix and said aqueous final mix being stable after freezing and thawing.

7. A substantially dry mix which when mixed with water forms a pudding, said dry mix comprising milk solids, noncross-linked hydroxypropyl starch, calcium acetate and tetrasodium pyrophosphate, both said dry mix and said aqueous final mix being stable after freezing and thawing.

8. A substantially dry mix which when mixed with water forms a pudding, said dry mix comprising milk solids, noncross-linked hydroxypropyl starch, calcium acetate, tetrasodium pyrophosphate and flavoring, both said dry mix and said aqueous final mix being stable after freezing and thawing.

References Cited

UNITED STATES PATENTS

| | | | |
|---|---|---|---|
| 3,021,222 | 2/1962 | Kerr et al. | 99—139 |
| 3,069,410 | 12/1962 | Smith et al. | 260—233.3 |
| 3,238,193 | 3/1966 | Tuschhoff et al. | 99—139 |

A. LOUIS MONACELL, *Primary Examiner.*

J. M. HUNTER, *Assistant Examiner.*